(12) United States Patent
Baracchino et al.

(10) Patent No.: US 12,545,353 B2
(45) Date of Patent: Feb. 10, 2026

(54) THREE- OR FOUR-WHEELED ROLLING MOTOR VEHICLE COMPRISING AN ELECTRONIC CONTROL UNIT OF A ROLL LOCKING SYSTEM

(71) Applicant: PIAGGIO & C. SPA, Pontedera (IT)

(72) Inventors: Luigi Baracchino, Pontedera (IT); Onorino Di Tanna, Pontedera (IT)

(73) Assignee: PIAGGIO & C. SPA, Pontedera (IT)

( * ) Notice: Subject to any disclaimer, the term of this patent is extended or adjusted under 35 U.S.C. 154(b) by 0 days.

(21) Appl. No.: 18/872,935

(22) PCT Filed: Apr. 18, 2023

(86) PCT No.: PCT/IB2023/053949
§ 371 (c)(1),
(2) Date: Dec. 9, 2024

(87) PCT Pub. No.: WO2023/237944
PCT Pub. Date: Dec. 14, 2023

(65) Prior Publication Data
US 2025/0353565 A1 Nov. 20, 2025

(30) Foreign Application Priority Data
Jun. 9, 2022 (IT) .......................... 102022000012251

(51) Int. Cl.
*B62K 5/10* (2013.01)
*B62K 5/08* (2006.01)

(52) U.S. Cl.
CPC . *B62K 5/10* (2013.01); *B62K 5/08* (2013.01)

(58) Field of Classification Search
CPC .................................. B62K 5/10; B62K 5/08
See application file for complete search history.

(56) References Cited

FOREIGN PATENT DOCUMENTS

| CA | 2943761 A1 | * | 10/2015 | ....... B62K 2025/047 |
| CA | 2943760 C | * | 2/2019 | ............... B62K 5/10 |

(Continued)

OTHER PUBLICATIONS

International Search Report for corresponding application PCT/IB2023/053949 filed Apr. 18, 2023; Mail date Oct. 11, 2023.

(Continued)

*Primary Examiner* — Paul N Dickson
*Assistant Examiner* — Shams Dhanani
(74) *Attorney, Agent, or Firm* — CANTOR COLBURN LLP (57) ABSTRACT

A three- or four-wheeled rolling motor vehicle including a main body having a front portion, a middle portion, and a tail portion; three or four wheels constrained to the main body, including at least two wheels arranged at the front portion or at the tail portion, a traction engine operatively connected to one of the wheels, a roll locking system of the wheels, controllable between a locking operational state and an unlocking operational state, an electronic control unit configured to control the roll locking system, wherein the electronic control unit has a first processing unit configured to receive and process a first input signal to establish the locking operational state or the unlocking operational state, where the electronic control unit includes a second processing unit configured to receive and process a second input signal to determine whether a safety condition is met, and provide consent to control the locking system to take or maintain the locking or the unlocking operational state, where the first and the second input signal comprise a first plurality of signals and a second plurality of input signals with at least one signal in common.

13 Claims, 3 Drawing Sheets

(56) References Cited

FOREIGN PATENT DOCUMENTS

| | | | |
|---|---|---|---|
| EP | 2127920 A1 | 12/2009 | |
| EP | 3124865 A1 | 2/2017 | |
| JP | 5204555 B2 * | 6/2013 | ............... B62K 5/10 |
| WO | 2019123092 A1 | 6/2019 | |
| WO | 2020117043 A1 | 6/2020 | |

OTHER PUBLICATIONS

Written Opinion for corresponding application PCT/IB2023/053949 filed Apr. 18, 2023; Mail date Oct. 11, 2023.

* cited by examiner

THREE- OR FOUR-WHEELED ROLLING MOTOR VEHICLE COMPRISING AN ELECTRONIC CONTROL UNIT OF A ROLL LOCKING SYSTEM

TECHNICAL FIELD

The present disclosure relates to the technical field of rolling motor vehicles, and in particular is directed to a three- or four-wheeled rolling motor vehicle comprising an electronic control unit of a roll locking system.

BACKGROUND

Rolling motor vehicles having three or four wheels have been known for a long time, in particular, rolling motor vehicles having at least one pair of steering and rolling wheels. In particular, rideable saddle motorcycles having three wheels, two wheels of which are steering and tilting front wheels, are very common. On such motorcycles, the wheels are generally symmetrical to the longitudinal median axis of the motorcycle. The rear wheel generally is a fixed-axle traction wheel while the front wheels allow the steerability of the motor vehicle. These motor vehicles combine the peculiarities of two-wheeled motorcycles in terms of handling with the stability of four-wheeled vehicles.

A rolling motor vehicle with two steering and rolling front wheels is described, for example, in European Patent EP1484239B1 to the same Applicant. In such a rolling motor vehicle, there are provided two suspensions, one for each of the two front wheels, equipped with shock absorbers and a front steering system comprising a connecting kinematic mechanism of the two front wheels, which in the aforesaid patent is an articulated quadrilateral kinematic mechanism. The connecting kinematic mechanism allows the front wheels, during steering and/or "leaning" operations of the motor vehicle, to remain substantially adjacent to the ground. Due to the structural peculiarity of this type of motor vehicles, it is possible that in some travel conditions, such as at very low speeds, the motor vehicle can tilt and fall as a result of the rolling movement.

In order to obviate to the aforesaid drawback and generally also to improve riding comfort, it is known to provide a roll locking system on this type of rolling motor vehicle, which ensures the stability of the rolling motor vehicle in any travel condition of the motor vehicle, and during parking stops and during stops of the motor vehicle itself, e.g., at a traffic light.

An example of a roll locking system is described in European Patent EP1561612B1 to the same Applicant. The roll locking system described in such a patent specifically comprises a stopping element, in particular a portion of a brake disc, integral with an element of the connecting kinematic mechanism of the two front wheels, in particular to an element of the articulated quadrilateral, in the rolling movements thereof. Moreover, the roll locking system comprises a locking element, in particular a brake caliper, to lock the position of the stopping element so as to prevent the rolling movements of the connecting mechanism kinematic. The roll locking system also comprises a parking unit operatively connected to the locking element to command the locking element itself. Specifically, the parking unit is operatively connected to the brake caliper, e.g., by means of a cable to make the brake caliper take a stable locking state, in which it locks the stopping element, and thus the articulated quadrilateral, and a releasing state, in which it releases the stopping element allowing the rolling motion of the articulated quadrilateral. The parking unit typically comprises a gear motor provided with a worm screw coupled to a helical tooth wheel. In addition to the locking element of the type described above, the parking unit can also control other locking devices, such as one or more stopping devices of the suspension stroke. A known suspension stroke stopping device, in particular for a rolling motor vehicle, is described in European Patent EP1571016B1 to the same Applicant.

An example of a parking unit is described in European patent application EP2837977A2 to the same Applicant. Such a parking unit is configured to control a roll locking device and/or a suspension stroke stopping device and/or a braking unit.

International patent application WO2021137153A1 to the same Applicant discloses a roll locking system for a vehicle comprising a gear motor adapted to actuate a roll locking device.

European patents EP3558801B1 and EP3558803B1 to the same Applicant describe forecarriages of rolling motor vehicles with rolling lock. International patent application WO2020245712A1 to the same Applicant describes a rolling motor vehicle with a roll locking system acting on the shock absorber. International patent application WO2021048800A1 to the same Applicant describes a further example of a rolling motor vehicle with a roll locking system.

In three- or four-wheeled rolling motor vehicles including a roll locking system, a particularly critical aspect related to safety is the electronic control of the roll locking system. Indeed, such an electronic control must be particularly safe, for example to control and ensure that the roll locking system is deactivated when the motor vehicle is traveling at a greater speed than a threshold speed and to control and ensure that the locking system is activated when the motor vehicle takes a parking state. To this end, the electronic control of the roll locking system should be able to rely on the use of a robust and high-performance electronic processing unit, a number of mutually heterogeneous magnitude or state sensors, complex algorithms and software codes, and reliable electronic and/or electromechanical components. Although at present a very satisfactory level of safety can be ensured by virtue of such contrivances, the need is felt to further increase the safety of rolling motor vehicles having a roll locking system.

Therefore, the present description provides a three- or four-wheeled rolling motor vehicle having a controllable roll locking system to activate and deactivate the roll lock and further having an electronic control unit for the roll locking system, which is such as to ensure particularly high levels of safety and reliability.

The disclosure will be better understood from the following detailed description of particular embodiments thereof, given by way of non-limiting example, with reference to the accompanying drawings briefly described in the following paragraph.

DETAILED DESCRIPTION

The same or similar elements are indicated by the same reference signs in the accompanying drawings.

Figure 1:
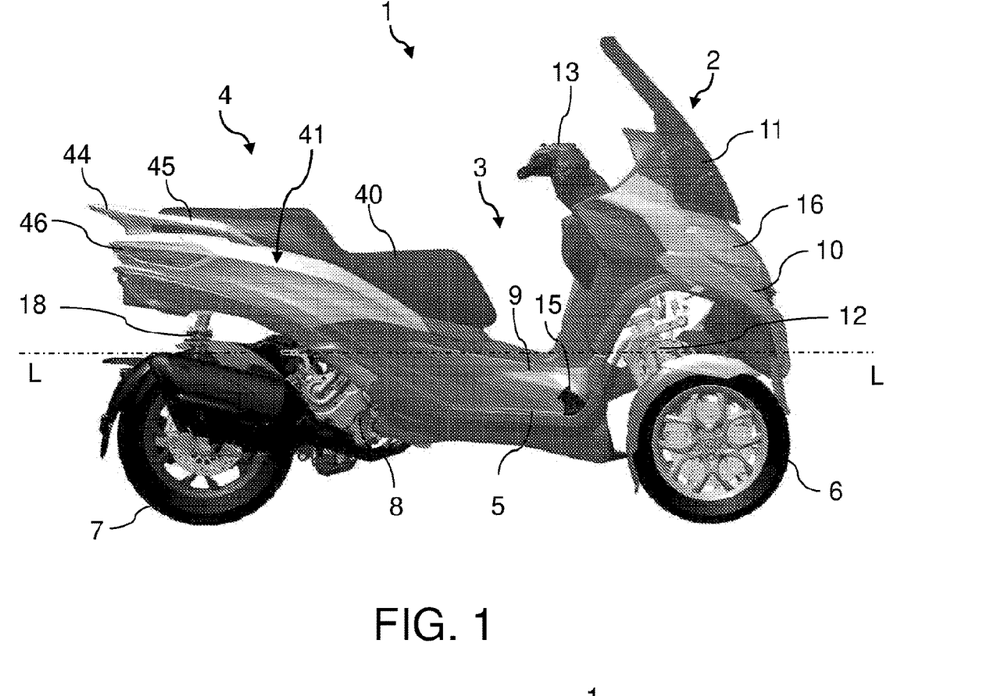
FIG. 1 shows an elevation side view of a non-limiting embodiment of a three-wheeled rolling motorcycle.
Figure 2:
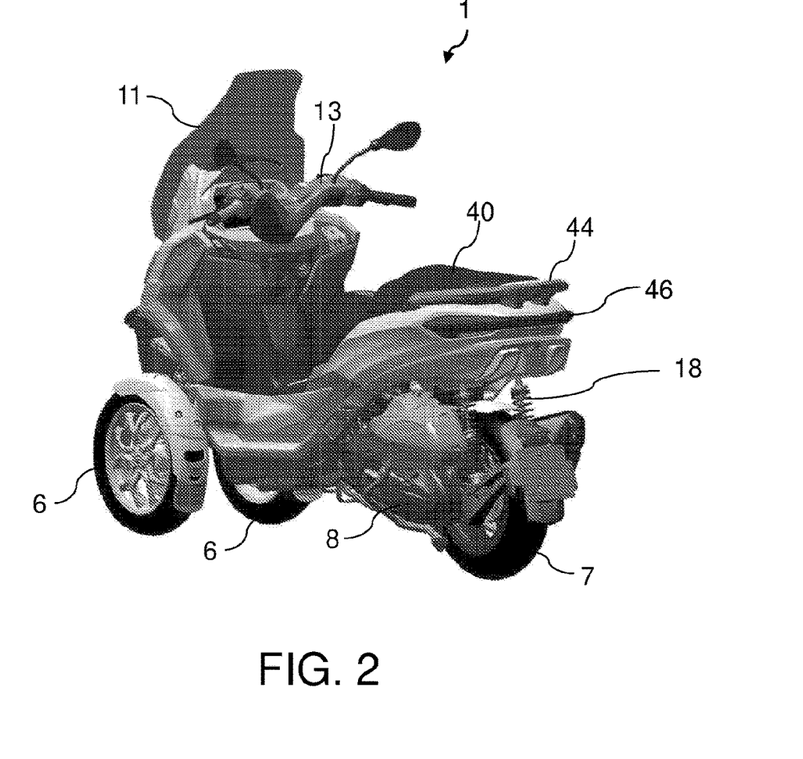
FIG. 2 shows an isometric side-rear view of the three-wheeled rolling motorcycle in FIG. 1.

FIGS. 1 and 2 show an embodiment of a ridable saddle rolling motor vehicle 1, which in the particular example depicted comprises, without introducing any limitation, of a three-wheeled rolling motorcycle comprising two front wheels 6 and one rear wheel 7. According to an advantageous embodiment, the two front wheels 6 are both rolling and steering wheels.

Hereinafter in the present description, without introducing any limitation, reference will be made to a general three- or four-wheeled rolling motor vehicle 1, meaning that the following description is generally applicable to any type of motor vehicle comprising:

- a main body 2, 3, 4, comprising a front portion 2, a middle portion 3, and a tail portion 4;
- three or four wheels 6, 7 constrained to the main body, where at least two wheels are rolling and arranged at the front portion 2 or at the tail portion 4;
- at least one thermal, electric or hybrid traction engine operatively connected to at least one wheel of the aforesaid three or four wheels 6, 7.

Note that the aforesaid definition of a rolling motor vehicle also comprises quads, tricycles and kick scooters, such as three-wheeled kick scooters as described in International Patent Application WO2021094940A1 to the same Applicant.

In the particular example depicted in FIGS. 1 and 2, the rolling motor vehicle 1 comprises a traction engine 8 operatively connected, either directly or indirectly, to the rear wheel 7, which is thus a traction wheel of the rolling motor vehicle 1.

The main body 2, 3, 4 of the rolling motor vehicle 1 extends along a longitudinal axis L-L, which is parallel to the travel axis of the motorcycle 1. Along the longitudinal axis L-L, the main body 2, 3, 4 of the three-wheeled motorcycle 1 has a front part 2, a tail part 4, and a middle part 3 interposed between the front part 2 and the tail part 4.

In the present description, unless otherwise indicated, the terms rear, front, upper, lower, lateral refer to the directions identified by the rolling motorcycle 1 following the direction of normal orientation of a motor vehicle placed vertically on a level ground and not tilted sideways or steered.

For example, the middle part 3 of the main body 2, 3, 4 comprises a footboard 5. For example, the footboard 5 is surmounted by a central tunnel 9.

In the example, the front part 2 of the main body 2, 3, 4 comprises a front shield 10, a windshield 11, two front suspensions 12, a steering handlebar 13, the front wheels 6.

In the example, the tail part 4 comprises the ridable saddle 40, the rear wheel 7, a rear suspension 18, a tail fairing 41. The tail fairing 41 is arranged below the ridable saddle 40. The tail part 4 further comprises a rear light assembly 46, preferably recessed into the tail fairing 41.

The tail part 4 of the main body 2, 3, 4 preferably comprises a luggage rack 44 and two grab handles 45 for a possible passenger. For example, the luggage rack 44 is a plate to which a top box can be fixed.

According to an embodiment, the three-wheeled rolling motor vehicle 1 is a tricycle. Tricycle means a motor vehicle having the features listed below:

- Three wheels 6, 7 arranged symmetrically with respect to the longitudinal axis L-L;
- A wheel track greater than 46 cm;
- A parking brake;
- A rear brake pedal 15.

Figure 3:
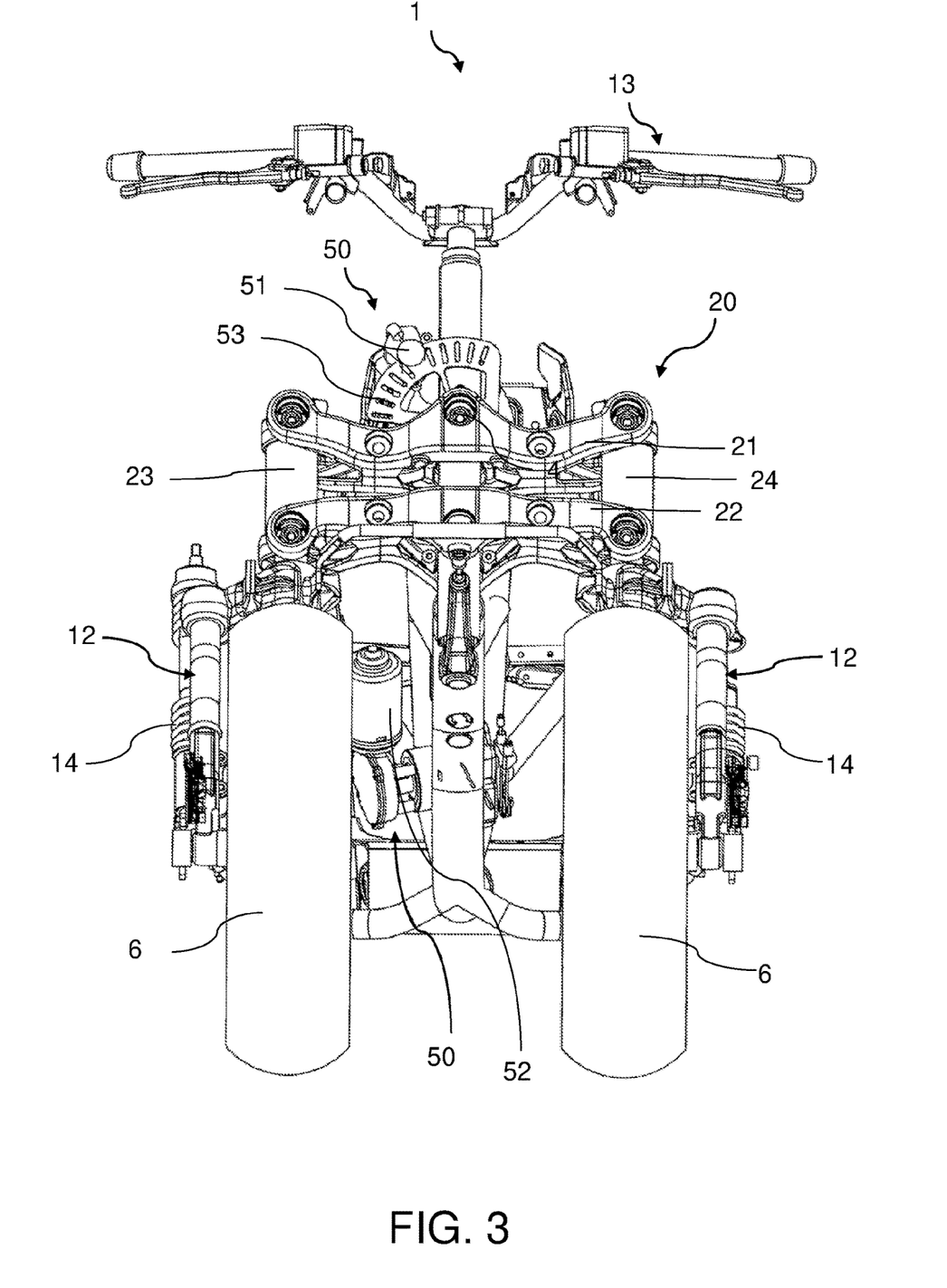
FIG. 3 shows a front elevation plane view of an embodiment of the frame of the three-wheeled rolling motorcycle in FIG. 1, in which a non-limiting example of a roll locking system can be seen.

Referring now to FIG. 3, such a figure shows the rolling motor vehicle 1 of FIGS. 1, 2 from which the fairings have been removed to make the front part of the frame visible. Moreover, in order to simplify FIG. 3, the rear wheel 7 was omitted from such a figure.

According to an embodiment, the two front wheels 6 are each provided with a front suspension 12, each of which is, in turn, provided with a shock absorber 14. Preferably, without introducing any limitations, the front suspensions 12 are mutually independent and more preferably the shock absorbers 14 are also mutually independent. The term suspension refers to the kinematic mechanism adapted to connect the sprung masses of the vehicle to the unsprung masses of the vehicle. According to an embodiment, the rolling motor vehicle 1 comprises a steering mechanism comprising an articulated quadrilateral kinematic mechanism 20 connected to the steering handlebar 13. According to an embodiment, the kinematic mechanism 20 comprises two mutually opposite rigid horizontal crossbars 21, 22, which are preferably hinged to the frame of the rolling motor vehicle 1 at the centerline thereof. In particular, the rigid horizontal crossbars 21, 22 comprise an upper horizontal crossbar 21 and a lower horizontal crossbar 22. Moreover, the kinematic mechanism 20 comprises two preferably vertical and mutually opposite struts 23, 24, preferably two sleeves 23, 24, which are hinged laterally to the horizontal crossbars 21, 22, and more preferably to the opposite ends of the crossbars 21, 22. According to an embodiment, the struts 23, 24 are rotatably connected to the front suspensions 12 so as to allow the rotation of the two front wheels 6 with respect to the frame of the rolling motor vehicle 1.

The rolling motor vehicle 1 comprises a roll locking system 50. According to an embodiment, the roll locking system 50 is a roll locking system 50 configured to avoid possible lateral rollovers of the rolling motor vehicle 1. Such lateral rollovers can occur, for example, when the rolling motor vehicle 1 is traveling below a predetermined speed or during stops and parking of the rolling motor vehicle 1. According to an embodiment, the roll locking system 50 comprises a locking device 51 and an actuator 52 of the locking device 51 connected to each other, e.g., by means of a Bowden cable. For example, an actuator 52 comprises a gear motor. Preferably, the locking device 51 comprises a brake caliper, which is preferably fixed to the frame of the rolling motor vehicle 1. The actuator 52 is operatively connected to the locking device 51 and is configured to make the locking device 51 take a locking state and an unlocking state. According to an embodiment, the roll locking system 50 comprises a stopping element 53, which preferably comprises a brake disc portion 53, e.g., a portion 53 corresponding to a "quarter" of a brake disc. The stopping element 53 is integral to an element of the articulated quadrilateral kinematic mechanism 20 in the rolling movements thereof. In particular, the stopping element 53 is preferably fixed to the upper horizontal crossbar 21.

The locking device 51 is configured to lock the position of the stopping element 53 with respect to the frame of the rolling motor vehicle 1. Thereby, the locking device 51 prevents the movements of the kinematic mechanism 20 and thus the roll of the motor vehicle 1. In other words, according to a preferred embodiment, the brake caliper 51 is commanded to close and open by the actuator 52. In particular, when the brake caliper 51 is commanded to close (locking state), it locks the stopping element 53 by clamping it and thus locks the rolling motion of the rolling motor vehicle 1. When commanded to open (unlocking state), the brake caliper 51 instead releases the stopping element 51 allowing the rolling motion of the motor vehicle 1.

As an alternative to the above-described architecture of a rolling motor vehicle having two steering wheels, the rolling motor vehicle 1 can alternatively comprise an articulated double quadrilateral forecarriage, as better known from document WO2014009637A1, or a different arrangement of the stopping and locking elements as better described in documents EP3397547A1 or EP2899107A1 which are incorporated in the present description by reference.

In each case, the roll locking system 50 is not limited to comprising the roll locking device of the type described above, but can additionally or alternatively comprise one or more locking devices of a different type, e.g., one or more suspension stroke stopping devices 12, as described for example in European Patent EP1571016B1 entirely incorporated herein by reference.

Therefore, from the above description with reference to FIGS. 1-3, it is apparent that, in general, the three- or four-wheeled rolling motor vehicle 1 of this description comprises:

a main body 2, 3, 4, comprising a front portion 2, a middle portion 3, and a tail portion 4;

three or four wheels 6, 7 constrained to the main body 2, 3, 4, comprising at least two rolling wheels 6 arranged at the front portion 2 or at the tail portion 4;

at least one traction engine 8 operatively connected to at least one of said three or four wheels 6, 7;

a roll locking system 50 of the two rolling wheels 6, controllable to selectively take a locking operational state and an unlocking operational state.

Figure 4:
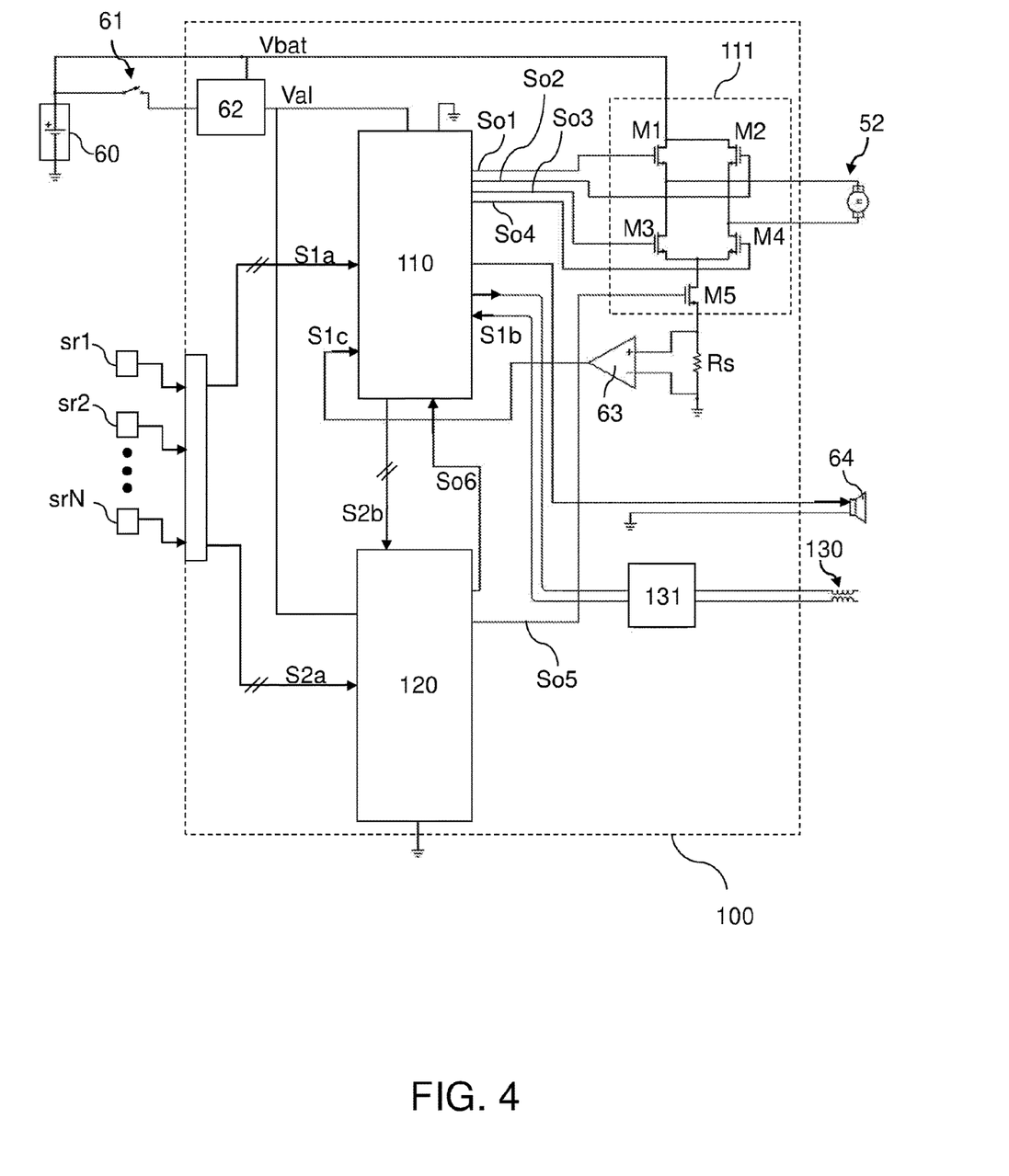
FIG. 4 shows a functional block chart of an embodiment of an electronic control unit of the roll locking system.

Referring to FIG. 4, the rolling motor vehicle 1 comprises an electronic control unit 100 of the roll locking system 50 operatively connected to the roll locking system 50 and configured to control the roll locking system 50.

The electronic control unit 100 comprises a first processing unit 110 configured to receive and process at least a first input signal S1$a$, S1$b$, S1$c$ to establish whether the roll locking system 50 must take or maintain the locking operational state or the unlocking operational state. "Take" means that a change from one current operational state to the other operational state is required. Instead, "maintain" means that the current operational state is to be maintained, i.e., a change in operational state is not required.

Preferably, the first processing unit 110 either is or comprises a first microcontroller. In general, a processing unit must be understood to mean a combination of hardware components and software and/or firmware modules which are adapted and configured, i.e., programmed, to receive input data, process input data, and output processed data and/or control signals. In order to carry out such operations, the processing unit can clearly comprise one or more data storage units.

For example, the first input signal S1$a$, S1$b$, S1$c$ carries information on the speed of the rolling motor vehicle 1 and/or the number of revolutions of the traction engine 8 and/or the torque delivered by the traction engine 8. In this example, the first processing unit 110 establishes that the roll locking system 50 must take or maintain the locking operational state if the speed of the rolling motor vehicle 1 and/or the number of revolutions and/or the torque of the traction engine 8 have values less than a threshold speed and/or a threshold number of revolutions and/or a threshold torque, respectively. Otherwise, the first processing unit 110 establishes that the roll locking system 50 must take or maintain the unlocking operational state. For example, the threshold speed has a value of, or of about, 20 km/h.

In a further example, as an alternative or addition to the example described in the previous paragraph, the first input signal S1$a$, S1$b$, S1$c$ carries information which allows the first processing unit 110 to establish whether the rolling motor vehicle 1 is in a parked state or not. If the first processing unit 110 establishes that the rolling motor vehicle 1 is in the parking state, then the locking system 50 must necessarily be in the locking operational state and cannot take the unlocking operational state, e.g., unless this is requested by a command entered by the driver.

The first input signal S1$a$, S1$b$, S1$c$ can comprise a plurality of signals S1$a$, e.g., signals provided by respective data sources sr1, sr2, . . . , srN provided onboard the rolling motor vehicle 1. The data sources sr1, sr2, . . . , srN can include, for example, one or more of the data sources in the following list: speed sensors, limit-stop sensors, position sensors, manual switches, hydraulic pressure sensors, driver presence sensors. A first set of signals provided by the data sources sr1, sr2, . . . , srN of the type described above and provided onboard the rolling motor vehicle 1 and/or in the roll locking system 50 was indicated by S1$a$ in FIG. 4.

In an additional or alternative embodiment to those described above, the first input signal S1$a$, S1$b$, S1$c$ can comprise at least one CAN bus signal S1$b$. In this case, the electronic control unit 100 comprises at least one CAN bus communication interface 131 operatively connected to the first processing unit 110 and adapted to operatively connect the first processing unit 110 to a CAN bus 130 provided onboard the rolling motor vehicle 1. Preferably, the aforesaid at least one CAN bus communication interface 131 is a two-way communication interface.

For example, the CAN bus communication interface 131 comprises a transceiver and/or CAN bus connector. For example, by means of the CAN bus communication interface 131 and the CAN bus signal S1$b$, the first processing unit 110 receives data related to the speed of the rolling motor vehicle 1 and/or data related to the number of revolutions of the traction engine 8 and/or data related to the torque delivered by the traction engine 8. For example, these data can be transmitted on the CAN bus 130 by an engine control unit or "ECU" provided onboard the rolling motor vehicle 1. Although only one CAN bus communication interface 131 is shown in the example in FIG. 4, in alternative embodiments more than one CAN BUS communication interface 131 can be provided in the electronic control unit 100.

In an additional or alternative embodiment to those described above, the first input signal S1$a$, S1$b$, S1$c$ can comprise at least one feedback signal S1$c$, which will be better described below.

The electronic control unit 100 comprises a second processing unit 120 operatively connected to the first processing unit 110 and configured to receive and process at least a second input signal S2$a$, S2$b$ to determine whether at least one safety condition is met or not. If said at least one safety condition is met, the second processing unit 120 is configured to provide consent to control the locking system 50 for it to take or maintain the locking operational state or the unlocking operational state established by the first processing unit 110. In other words, when the aforesaid safety condition is met, the second processing unit 120 validates the work of the first processing unit 110 by giving its consent. If not, the second processing unit 120 does not validate the work of the first processing unit 110 by not giving its consent. Preferably, the second processing unit 120 either is or comprises a second microcontroller.

According to an embodiment, the second input signal S2a, S2b comprises an input signal S2b provided by the first processing unit 110 to the second processing unit 120. In this case, the second processing unit 120 is advantageously configured to perform an integrity check of the input signal S2b provided by the first processing unit 110 in order to establish whether said signal S2b is intact or corrupted. If the second processing unit 120 establishes that the provided input signal S2b is corrupted, the second processing unit 120 is such as to determine that said at least one safety condition is not met.

According to a particularly advantageous embodiment, the aforesaid at least one safety condition comprises a combination of safety conditions which must all be met to allow the second processing unit 120 to provide the consent to control the locking system 50 for it to take or maintain the locking operational state or the unlocking operational state established by the first processing unit 110. In a particularly advantageous embodiment, the combination of safety conditions comprises:
- at least a first safety condition representative of the correct operation of the first processing unit 110, e.g., an integrity check of the signal S2b provided by the first processing unit 110 to the second processing unit 120; and
- at least a second safety condition representative of an operating parking and/or traveling state of the rolling motor vehicle 1, e.g., a safety condition based on comparing the speed of motor vehicle 1 with a threshold speed and/or a safety condition based on checking whether the driver is onboard the rolling motor vehicle or not.

The aforesaid integrity check comprises, for example, a parity check or checksum or CRC or a check for the correct sequencing of data packets or messages sent by the first processing unit 110 by means of the input signal S2b. For example, if the second processing unit 120 establishes that the input signal S2b is corrupted, then it also determines that the aforesaid at least one safety condition is not met and thus does not provide consent to control the locking system 50 for it to take or maintain the locking operational state or the unlocking operational state established by the first processing unit 110. This advantageously avoids the first processing unit 110 from imparting incorrect and/or arbitrary commands to the roll locking system 50 due to unexpected malfunctions thereof.

According to a particularly advantageous embodiment, the second processing unit 120 is configured to force a reset of the first processing unit 110 if it establishes that the input signal S2b provided by the first processing unit 110 to the second processing unit 120 is corrupted. For example, this is done by sending a reset signal So6 from the second processing unit 120 to the first processing unit 110.

In the embodiment described above in which the first processing unit 110 is connected to the CAN bus 130, it is advantageous to provide that the first processing unit 110 is configured to send data received by means of the CAN bus 130, or at least a portion of such data, to the second processing unit 120 by means of said provided first input signal S2b. For example, such data comprise data related to the speed of the rolling motor vehicle 1 and/or the number of revolutions of the traction engine 8 and/or the torque provided by the traction engine 8.

It is also advantageous to provide that, of the first processing unit 110 and the second processing unit 120, only the first processing unit 110 is connected, in particular directly connected, to the CAN bus communication interface 131. In other words, the second processing unit 120 receives data from the CAN bus 131 by means of the first processing unit 110. Such data are, for example, only a subset of the data received by means of the CAN bus 130 from the first processing unit 110, e.g., data related to the speed of the rolling motor vehicle 1 and/or the number of revolutions of the traction engine 8 and/or the torque provided by the traction engine 8.

According to an advantageous embodiment:
- the first input signal S1a, S1b, S1c and the second input signal S2a, S2b comprise a first plurality of signals and a second plurality of input signals, respectively;
- the first and second pluralities of input signals comprise at least one signal in common.

For example, in the embodiment shown in FIG. 4, it has been assumed that the first input signal S1a, S1b, S1c and the second input signal S2a, S2b comprise a first set of signals S1a and a second set of signals S2a, which form the same set of signals which are received as input in parallel and processed in parallel, preferably in real time, by both the first processing unit 110 and the second processing unit 120 and which are provided by the same data sources sr1, sr2, . . . , srN provided onboard the rolling motor vehicle 1. For example, such a set of input signals received in common by the first processing unit 110 and the second processing unit 120 comprises one or more signals from the following list:
- a signal representative of the presence or absence of the driver onboard the rolling motor vehicle 1;
- a signal representative of the speed of the rolling motor vehicle 1, preferably comprising two signals, each representative of the rotational speed of a respective rolling and steering wheel 6;
- a signal representative of the state of actuator 52, e.g., a signal representative of the angular position of a rotating shaft of the actuator 52;
- a signal of a manual request for locking or unlocking the locking system 50, entered by means of a manual command from the driver, e.g., by means of a manual switch, such as a rocking lever or push-button switch.

As already explained, in an embodiment the roll locking system 50 can comprise an actuator 52, e.g., a gear motor. In such an embodiment, the electronic control unit 100 advantageously comprises a driving circuit 111 configured to receive at least one control signal So1, . . . , So4 based on which the driving circuit 111 can provide a power supply signal Vbat to the actuator 52 or not. The driving circuit 111 is also configured to receive also a consent signal So5 based on which the driving circuit 111 can selectively take a first circuit state, in which the driving circuit 111 can provide the power supply signal Vbat to the actuator 52, and a second circuit state, in which the driving circuit 111 cannot provide the power supply signal Vbat to the actuator 52. The second processing unit 120 is connected to the driving circuit 111 to provide the consent signal So5 thereto based on whether said at least one safety condition is met or not. As already explained, for example, such a safety condition is met if the signal S2b provided as input from the first processing unit 110 to the second processing unit 120 is intact, while it is not met if such a signal S2b is corrupted.

In the particular example depicted in FIG. 4, the power supply signal of the actuator 52 is a supply voltage Vbat supplied by an onboard rechargeable battery 60 of the rolling motor vehicle 1. Moreover, in the example in FIG. 4, the control signal So1, . . . , So4 comprises a plurality of control signals, in particular four control signals.

According to a possible non-limiting embodiment, the control signal So1, . . . , So4 is provided to the driving circuit 111 by the first processing unit 110. Therefore, in this case, the second processing unit 120 provides consent to control the driving circuit 111, e.g., by means of the consent signal So5, while the first processing unit 110 controls the driving circuit 111 and thus the actuator 52 only if the second processing unit 120 provides consent.

However, alternative embodiments can be provided, in which both the functions of control of the driving circuit 111 and consent to such a control are performed by the second processing unit 120. Thus, in this case, the first processing unit 110 merely establishes, based on the first input signal S1a, S1b, S1c, what the operational state of the roll locking system 50 should be and communicates this information to the second processing unit 120. Instead, the second processing unit 120, upon checking the aforesaid safety condition, by means of the driving circuit 111 controls the roll locking system 50 for it to take or maintain the operational state established by the first processing unit 110 only if it determines that the safety condition is met.

According to a particularly advantageous embodiment, the driving circuit 111 comprises an electronic switch M5 controlled by the consent signal So5. In practice, the electronic switch M5 fulfills the function of a safety switch. For example, by means of the electronic switch M5, in the electronic control unit 100 it is possible to selectively interrupt and restore the power supply Vbat of the driving circuit 111 and thus the power supply of the actuator 52. According to a particularly advantageous embodiment, the driving circuit 111 comprises an H-bridge, and the electronic switch M5 is connected in series to the H-bridge. Thereby, the electronic switch M5 allows enabling and disabling the H-bridge. As known to those skilled in the art, an electronic switch means, for example, a transistor, such as a MOSFET.

In the example depicted in FIG. 4, the H-bridge comprises four electronic switches M1-M4, each of which receives a respective control signal So1, . . . , So4 as input. In the H-bridge, when the electronic switches M1 and M4 are controlled to be in the conduction state, the electronic switches M2 and M3 are controlled to be in the interdiction state. By virtue of the supply voltage Vbat, if the electronic switch M5 is in the conduction state, a current having a first direction flows through the switches M1 and M4. Conversely, when the switches M2 and M3 are controlled to be in the conduction state, the electronic switches M1 and M4 are controlled to be in the interdiction state. By virtue of the supply voltage Vbat, if the electronic switch M5 is in the conduction state, a current having a direction opposite to the first direction flows through the switches M2 and M3. Thereby, it is possible to drive the actuator 52, e.g., the gear motor 52, so that a drive shaft of the actuator 52 moves, e.g., rotates, in mutually opposite directions, for example to open or close the caliper 51 to thus take the roll locking system 50 into the locking operational state or the unlocking operational state, respectively. On the other hand, when the electronic safety switch M5 is in the interdiction state, regardless of the state of the switches M1-M4, thus regardless of the control signals So1-So4, it is not possible to supply power to the driving circuit 111 and the actuator 52. Therefore, in this case, it is not possible to change the operational state of the locking system 50.

Finally, in the particular example depicted 4, further components are depicted, such as a feedback circuit Rs, 63 comprising a shunt resistor Rs and a signal amplifier 63.

The feedback circuit Rs, 63 is configured to provide the feedback signal S1c. This feedback signal S1c allows checking whether, in response to a command imparted by means of the control signals So1-So4 to the driving circuit 111, there was a flow of current in the shunt resistor Rs and thus in the driving circuit 111 and the actuator 52. When the feedback signal S1c is provided as input to the first processing unit 110, by means of such a signal S1c it is possible to inform the first processing unit 110 that a command imparted by the first processing unit 110 to the roll locking system 50, in the example by means of the control signals So1-So4, has been successful or unsuccessful, e.g., because the second processing unit 120 has validated such a command by giving or denying its consent, respectively, for example by means of the safety switch M5. In addition, the feedback signal S1c allows the first processing unit 110 to be informed that the actuator 52 is properly connected, that it is not short-circuited, and that the electrical power absorptions of the driving circuit 111 are compatible with the absorptions expected by the first processing unit 110. This advantageously allows avoiding overheating and in any case allows managing and/or detecting fault conditions.

Preferably, the electronic control unit 100 is operatively connected to a main on/off switch 61 of the rolling motor vehicle 1. Such a main switch 61 is commanded, for example, by an electronic or physical key to turn on and off the rolling motor vehicle 1. By means of the main on/off switch 61, it is possible to either provide or interdict the power supply to the electronic control unit 100 by the onboard rechargeable battery 60. Conveniently, the electronic control unit 100 further comprises at least one voltage regulator 62 which allows providing a supply voltage Val of appropriate value to the first processing unit 110 and the second processing unit 120, thus obtaining such a supply voltage Val from the battery supply voltage Vbat.

Finally, according to an advantageous embodiment, the electronic control unit 100 is operatively connectable to at least one sound signaling device 64, which comprises a buzzer and/or an acoustic warning device of the rolling motor vehicle 1, to provide an acoustic signaling related to the operational state, or a change in the operational state, of the roll locking system 50. In the example in FIG. 4, without introducing any limitations, the sound signaling device 64 is operatively connected to, and controlled by, the first processing unit 110 but in an alternative embodiment, it could be operatively connected to, and controlled by, the second processing unit 120.

Based on the explanation above, it is thus possible to understand how a three- or four-wheeled motor vehicle 1 of the type described above allows achieving the objects mentioned above with reference to the prior art. Indeed, with the provision of two processing units 110, 120, it is possible to greatly increase the safety of the roll locking system 50 by having one of the two processing units validate the work of the other processing unit or not, based on the outcome of a check of at least one safety condition.

Without prejudice to the principle of the disclosure, the embodiments and the constructional details may be broadly varied with respect to the above disclosure merely given by way of a non-limiting example, without departing from the scope of the disclosure as defined in the appended claims.

The invention claimed is:

1. A three- or four-wheeled rolling motor vehicle comprising:
   a main body, comprising a front portion, a middle portion, and a tail portion;
   three or four wheels constrained to the main body, comprising at least two rolling wheels arranged at the front portion or at the tail portion;
   at least one traction engine operatively connected to at least one of said three or four wheels;
   a roll locking system of the two rolling wheels, controllable to selectively take a locking operational state and an unlocking operational state;
   an electronic control unit of the roll locking system operatively connected to the roll locking system and configured to control the roll locking system, wherein the electronic control unit comprises a first processing unit configured to receive and process at least a first input signal to establish whether the roll locking system must take or maintain the locking operational state or the unlocking operational state;
   wherein:
      the electronic control unit comprises a second processing unit operatively connected to the first processing unit and configured to receive and process at least a second input signal to determine whether at least one safety condition is met or not, and provide consent to control the locking system for it to take or maintain the locking operational state or the unlocking operational state established by the first processing unit;
      the first input signal and the second input signal comprise a first plurality of signals and a second plurality of input signals, respectively;
      said first and said second pluralities of signals comprise at least one signal in common.

2. A three- or four-wheeled rolling motor vehicle according to claim 1, wherein said at least a second input signal comprises an input signal provided by the first processing unit to the second processing unit and wherein the second processing unit is configured to check the integrity of said input signal provided by the first processing unit in order to establish whether said provided input signal is intact or corrupted, and, if the second processing unit establishes that said provided input signal is corrupted, the second processing unit is such as to determine that said at least one safety condition is not met.

3. A three- or four-wheeled rolling motor vehicle according to claim 2, wherein the second processing unit is configured to force a reset of the first processing unit if it establishes that said first input signal is corrupted.

4. A three- or four-wheeled rolling motor vehicle according to claim 2, wherein the rolling motor vehicle comprises a CAN bus, wherein the first processing unit is connected to the CAN bus and is configured to send data received by means of the CAN bus to the second processing unit, and wherein said provided first input signal carries said data received by means of CAN bus.

5. A three- or four-wheeled rolling motor vehicle according to claim 4, wherein the electronic control unit comprises at least one CAN bus communication interface, and wherein, of the first processing unit and the second processing unit, only the first processing unit is connected to the CAN bus by means of the CAN bus communication interface.

6. A three- or four-wheeled rolling motor vehicle according to claim 1, wherein the roll locking system comprises an actuator, and wherein:
   the electronic control unit comprises a driving circuit configured to receive at least one control signal based on which the driving circuit can provide a power supply signal to the actuator or not;
   the driving circuit is also configured to receive a consent signal based on which the driving circuit can selectively take a first circuit state, in which the driving circuit can provide the power supply signal to the actuator, and a second circuit state, in which the driving circuit cannot provide the power supply signal to the actuator;
   the second processing unit is connected to the driving circuit to provide the consent signal to the driving circuit based on whether said at least one safety condition is met or not.

7. A three- or four-wheeled rolling motor vehicle according to claim 6, wherein the control signal is provided to the driving circuit by the first processing unit.

8. A three- or four-wheeled rolling motor vehicle according to claim 6, wherein the driving circuit comprises an electronic switch controlled by the consent signal.

9. A three- or four-wheeled rolling motor vehicle according to claim 8, wherein the driving circuit comprises an H-bridge and wherein the electronic switch is connected in series to the H-bridge.

10. A three- or four-wheeled rolling motor vehicle according to claim 1, wherein said at least one safety condition comprises a combination of safety conditions which must all be met to allow the second processing unit to provide the consent to control the locking system for it to take or maintain the locking operational state or the unlocking operational state established by the first processing unit.

11. A three- or four-wheeled rolling motor vehicle according to claim 10, wherein said combination of safety conditions comprises:
   at least a first safety condition representative of the correct operation of the first processing unit; and
   at least a second safety condition representative of an operating parking and/or traveling state of the rolling motor vehicle.

12. A three- or four-wheeled rolling motor vehicle according to claim 1, wherein the rolling motor vehicle is a rideable saddle motorcycle and wherein said rolling wheels are front wheels.

13. A three- or four-wheeled rolling motor vehicle according to claim 1, wherein said rolling wheels are mutually interconnected by an articulated quadrilateral, and wherein the locking device is configured to lock a stopping element integral with a branch of the articulated quadrilateral.

* * * * *